United States Patent [19]

Andō et al.

[11] Patent Number: 4,764,912
[45] Date of Patent: Aug. 16, 1988

[54] OPTICAL FOCUSING IN MAGNETO-OPTIC DISK SYSTEM

[75] Inventors: Hideo Andō, Kawasaki; Akihiko Doi, Tokyo, both of Japan

[73] Assignee: Kabushiki Kaisha Toshiba, Kawasaki, Japan

[21] Appl. No.: 915,529

[22] Filed: Oct. 6, 1986

[30] Foreign Application Priority Data

Oct. 8, 1985 [JP] Japan ................. 60-222649

[51] Int. Cl.⁴ ................................ G11B 7/00
[52] U.S. Cl. ........................ 369/45; 369/46;
369/13; 360/114; 250/201
[58] Field of Search ................ 369/43–47,
369/13; 250/201 DF; 358/342; 360/114

[56] References Cited

U.S. PATENT DOCUMENTS

| | | |
|---|---|---|
| 3,925,603 | 12/1975 | Naruse et al. ............. 178/6.6 |
| 4,123,652 | 10/1978 | Bouwhuis ............. 250/204 |
| 4,357,533 | 11/1982 | Winslow ............. 250/204 |
| 4,626,679 | 12/1986 | Kuwayama et al. ............. 369/44 X |

*Primary Examiner*—Robert L. Richardson
*Attorney, Agent, or Firm*—Finnegan, Henderson, Farabow, Garrett and Dunner

[57] ABSTRACT

In an optical head, a polarized laser beam is converged by an objective lens onto a magnetooptical disk to which a magnetic field is applied by a magnet unit in recording or erasing mode. The laser beam reflected from the disk is reflected by a half prism, passes through a half wave plate, and is applied to a polarizing beam splitter. The laser beam is splitted into first and second laser beams, which are applied to first and second photodetectors having a same structure, through cylindrical lenses. The detection signals output from the photodetectors are processed into a focusing error signal. The objective lens is moved along its optical axis by a voice coil driver in response to the focusing error signal.

15 Claims, 7 Drawing Sheets

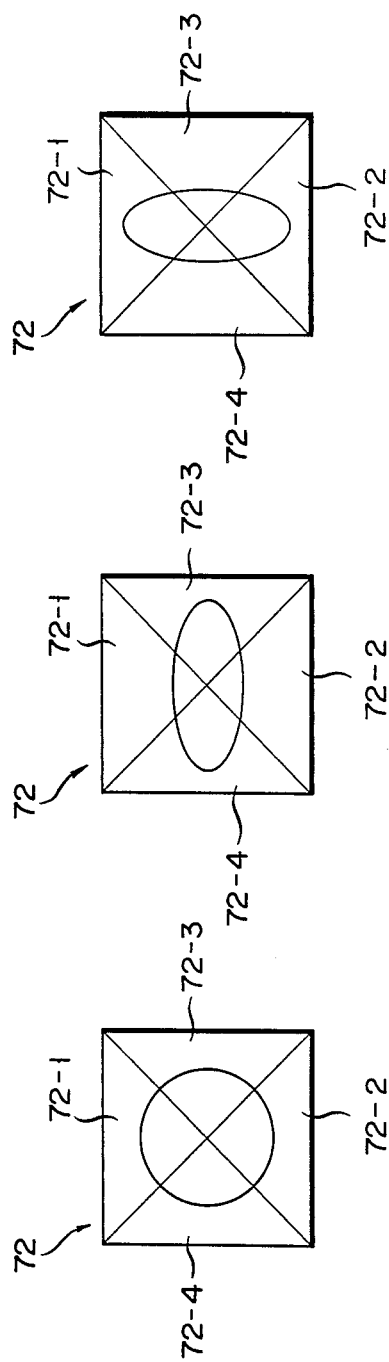
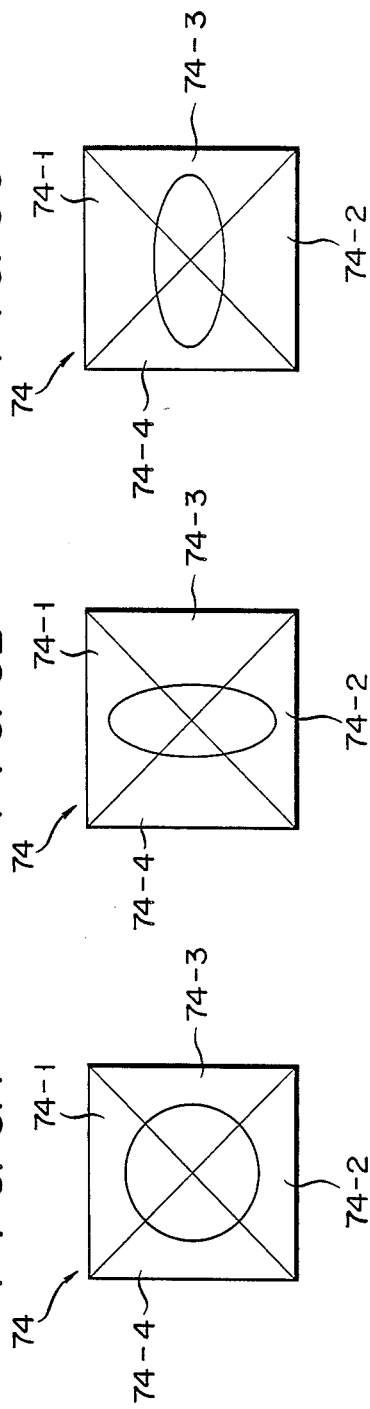

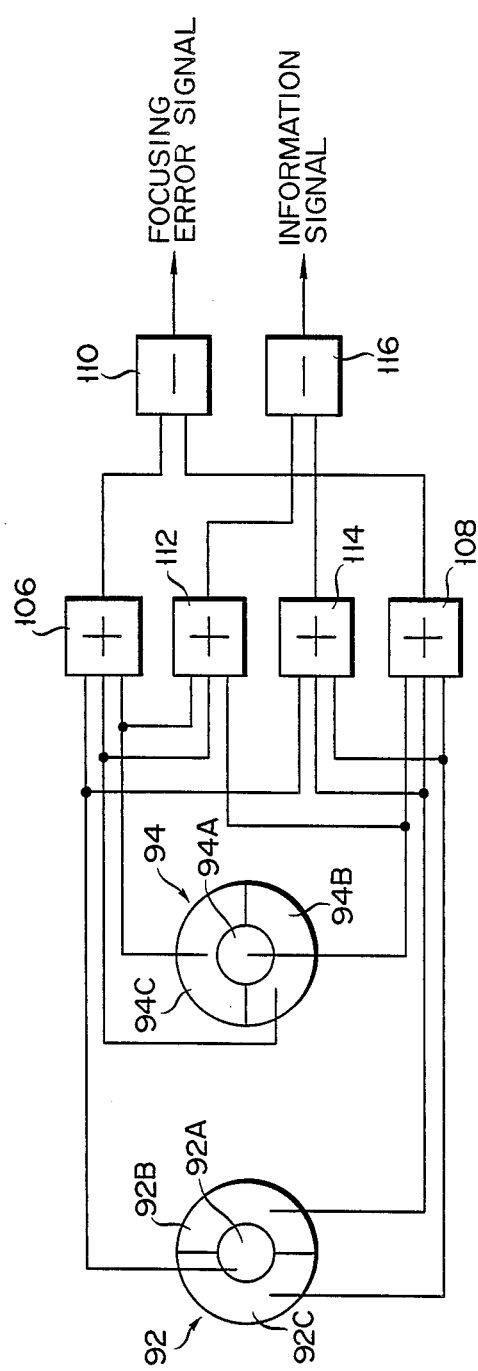

OPTICAL FOCUSING IN MAGNETO-OPTIC DISK SYSTEM

BACKGROUND OF THE INVENTION

The present invention relates to an optical head adapted for use in an apparatus, which can record information on an erasable recording medium, retrieve and erase the recorded information from the medium, and more specifically, to an optical head of a simple construction for the apparatus.

Conventionally there have been developed apparatuses which can optically record on, or retrieve or erase information from an information storage medium, using magnetooptical effects, such as the Kerr effect, Faraday effect, etc. These apparatuses generally use an optical head, as shown in FIG. 1 or 2.

In the optical head shown in FIG. 1, an elliptic light beam, emitted from semiconductor laser 10, is transformed into a circular, parallel beam, by collimator lens 12 and ellipse compensating prism 14. The collimated beam is led to objective lens 20, through beam splitter 16 and mirror 18, and is converged on information storage medium 22.

The light beam, reflected by information storage medium 22, is reflected again by mirror 20 and beam splitter 16, and then split into two divergent beams by beam splitter 24. One of the divergent beams is transmitted through half-wave plate 26, to have its polarization face rotated through approximately 45 degrees, and is then converged by convex lens 28. The converged beam is split into P- and S-polarized light components by polarized-beam splitter 30. Light beams equivalent to the P-polarized and S-polarized components are incident on photodetectors 32 and 34. The other divergent beam from splitter 24 is transmitted through convex lens 36 and cylindrical lens 38, to be incident on photodetector 40.

In the optical head thus constructed, a focusing error signal is delivered from photodetector 40, while a tracking signal is delivered from one of photodetectors 32 and 34. Information stored in information storage medium 22 is read out in accordance with the difference in intensity between the P- and S-polarized component beams, i.e., the difference between output signals from photodetectors 32 and 34.

The optical head shown in FIG. 2 has no beam splitters, but is provided with spherical concave lens 42 instead. Photodetector 40, which is used to detect a P-polarized component light beam from polarized-beam splitter 30, produces a focusing error signal. Photodetector 44, which serves to detect an S-polarized component light beam from splitter 30, produces a tracking signal. The information stored in information storage medium 22 is read out in accordance with the difference between output signals from photodetectors 40 and 42.

In these prior art optical heads, the so-called differential detection method is used in reading the information from the information storage medium, in order to improve the signal-to-noise ratio of retrieved information signals. The optical head of FIG. 1 is provided with a focusing-error detection system, besides a retrieval signal detection system. Thus, it is complicated, requiring an increased number of optical components.

In the focusing error detection, the optical heads of FIGS. 1 and 2 both use the so-called astigmatism process (stated in Japanese Patent Publication No. 53-39123). In this process, the focusing error signal is liable to produce noise, influenced by a diffraction pattern, which is caused when a beam spot on the information storage medium crosses a continuous groove, used as a track guide. Thus, the focusing error sometimes cannot be detected accurately. If the storage medium is tilted, beam spots move on the photodetectors, so that the focusing error detection cannot be accurate.

SUMMARY OF THE INVENTION

The object of the present invention is to provide an optical head of a relatively simple construction, which can accurately detect focusing errors and be used with an erasable information recording medium.

According to the present invention, there is provided a system which records information on an information recording medium, and retrieves and erases the recorded information from the medium, and which comprises means for emitting a light beam; an objective lens for converging the light beam, to the information recording medium; means for applying a magnetic field to the information recording medium, in erasing or recording the information; means for splitting the light beam, reflected from the information recording medium and transmitted through the objective lens, into first and second light beams which are polarized on different polarization planes, respectively; a first photodetector having a plurality of photosensitive regions on which the first polarized light beam is incident, whereby the first light beam is detected, the photosensitive regions generating detection signals; a second photodetector having a plurality of photosensitive regions on which the second light beam is incident, whereby the second light beam is detected, the photosensitive regions generating detection signals; means for processing the detection signals from the photosensitive regions of the first and second photodetectors, and generating a focusing error signal and an information signal; and means for moving the objective lens along the optical axis thereof, in accordance with the focusing signal, whereby the objective lens can continuously focus the light beam on the information recording medium.

BRIEF DESCRIPTION OF THE DRAWINGS

FIGS. 5A, 5B, 5C, 6A, 6B and 6C are plan views showing configurations of beam spots formed on the photodetectors of FIG. 4, in focusing and defocusing states;

FIG. 8 is a block diagram showing a circuit for processing signals from photodetectors, shown in FIG. 7, and delivering a focusing error signal and an information signal.

DETAILED DESCRIPTION OF THE PREFERRED EMBODIMENTS

Figure 1:
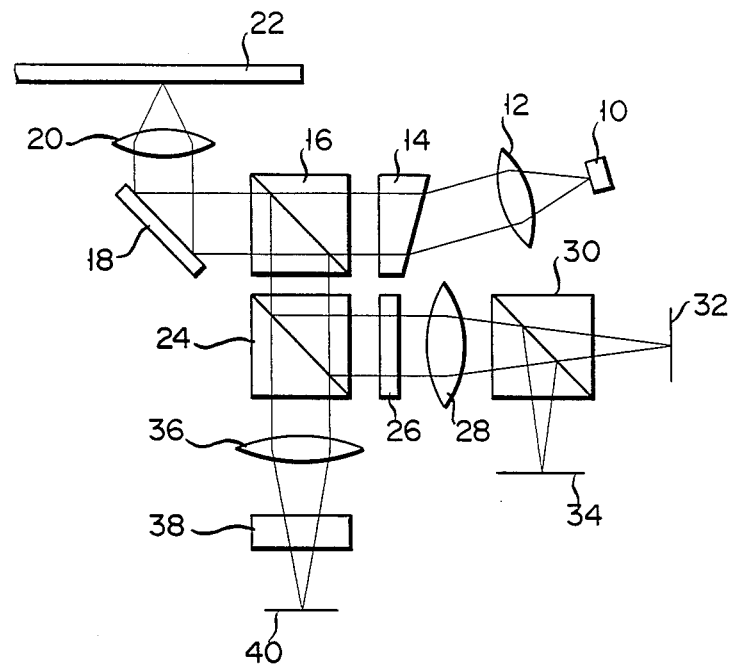
FIGS. 1 and 2 are schematic views showing conventional optical systems of optical heads.
Figure 2:
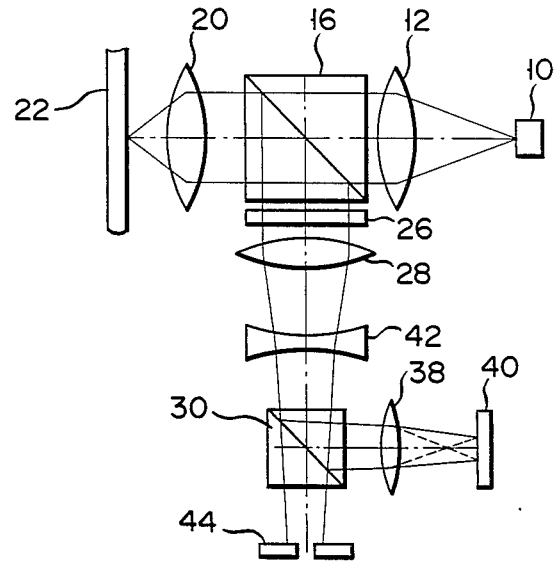
Figure 3:
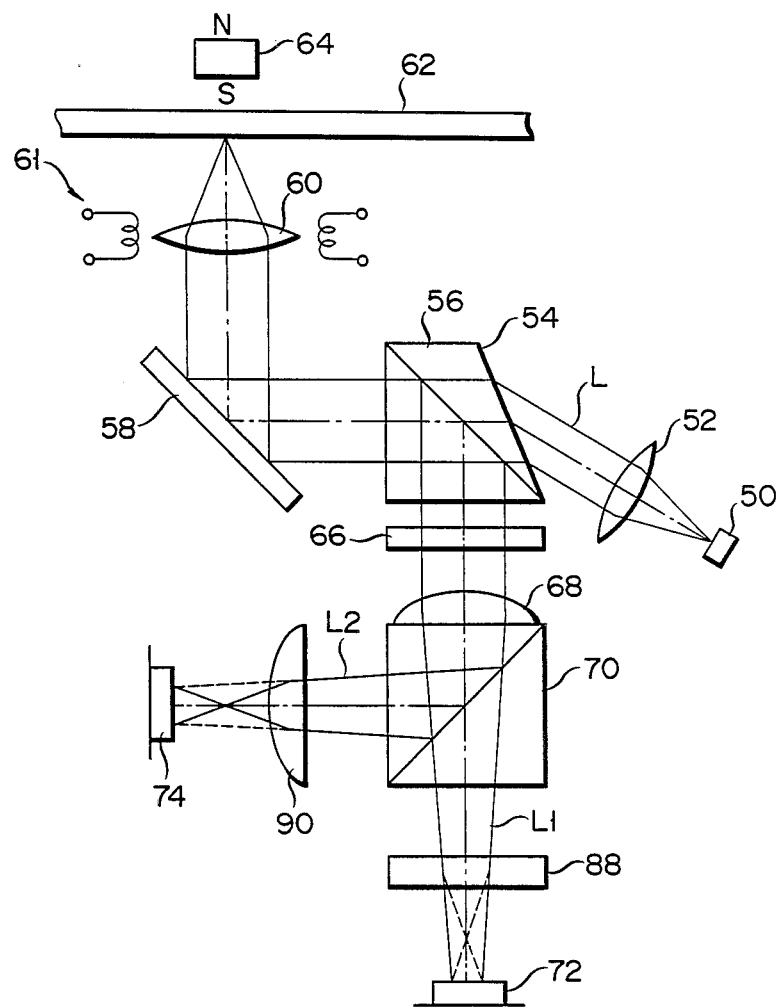
FIG. 3 is a schematic view of an optical head according to an embodiment of the present invention.
Figure 4:
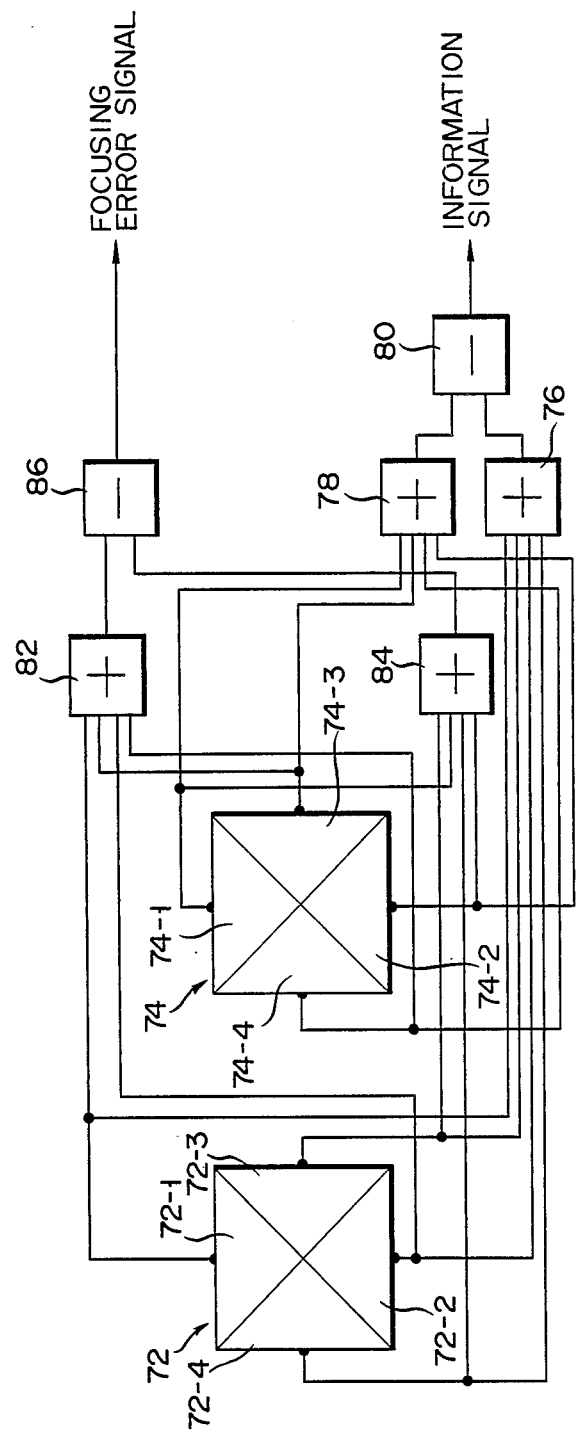
FIG. 4 is a block diagram showing a circuit for processing signals from photodetectors, shown in FIG. 3, and delivering a focusing error signal and an information signal.

FIG. 3 shows an optical head according to an embodiment of the present invention.

In this optical head, substantially linearly polarized, elliptic laser beam L is emitted from semiconductor laser 50, as a light source, and is converted into a parallel beam by collimator lens 52, to be diagonally incident on incidence surface 54 of beam splitter 56.

Semiconductor laser 50, which is driven by a driver circuit (not shown), emits laser beam L with a fixed luminous intensity, in a retrieval mode. In a recording mode, laser 50 emits laser beam L whose luminous intensity is modulated in accordance with information to be recorded. In an erasing mode, laser 50 emits laser beam L of a fixed luminous intensity higher than that in the retrieval mode.

Since elliptic laser beam L is diagonally incident on incidence surface 54 of beam splitter 56, e.g., a prism having a half-mirror surface on which a coating layer is formed, it is changed into a circular beam on incident surface 54 of splitter 56. Beam L, transmitted through splitter 56, is reflected by mirror 58, to be incident on objective lens 60, whereby it is converged on information memory medium 62.

The coating layer of beam splitter 56 can reflect a P-polarized beam which has an intensity of equal to that of an incident P-polarized beam, and a S-polarized beam which has an intensity of 30% of that of the incident S-polarized beam. It can also transmit an S-polarized beam which has an intensity of 70% of that of the incident S-polarized beam. Thus, the light beam applied from beam splitter 56 to objective lens 60 is mainly composed of the P-polarized component, and its linear polarization is improved.

Information memory medium 62, or an optical disk, has a recording layer formed of, e.g., amorphous magnetic alloy. A tracking guide is formed spirally or concentrically, on the surface of optical disk 62. The tracking guide is formed with prepits, which provide preliminary information or preformat signals, such as track addresses, sector addresses, etc. When no information is recorded on the recording layer of optical disk 62, all the magnetic domains of the layer are oriented in a fixed direction. When information is recorded on some regions of the recording layer, the magnetic domains of the regions are oriented, in the opposite direction.

In the recording mode, a static magnetic field, generated from magnet device 64, is applied to optical disk 62, and the tracking guide of the optical disk 62 is traced by laser beam L for recording, which is intensity-modulated in accordance with the information to be recorded. Thereupon, a specific region of the recording layer is heated quickly, so that the direction of magnetization there is reversed, thus permitting information recording. In the retrieval mode, the tracking guide is traced by laser beam L for retrieval, and linearly polarized, converging laser beam L is applied to a reversely magnetized magnetic-domain region. As a result, the polarization face of beam L is rotated slightly. In the erasing mode, a static magnetic field, generated from magnet device 64, is applied to optical disk 62, and laser beam L for erasing is applied to a specific region where the magnetization direction is reversed. Thereupon, the specific region is heated slowly, so that the magnetization direction there is reversed again, to be identical with that in the other region.

Laser beam L, reflected from optical disk 62, is transmitted through objective lens 60, and reflected by mirror 58, to be led into beam splitter 56, in which it is reflected. The reflected laser beam is passed through half-wavelength plate 66 to increase the ratio of S-polarized component to P-polarized component, and its polarization plane is rotated through approximately 45 degrees. Laser beam L, with its polarization plane rotated in this manner, is converged by converging lens 68, and led to polarized-beam splitter 70 which splits beam L into P- and S-polarized components.

The P-polarized light component of the laser beam, transmitted through polarized-beam splitter 70, is delivered to first photodetector 72 through cylindrical lens 88. On the other hand, the S-polarized light component, reflected by splitter 70, is delivered to second photodetector 74 through cylindrical lens 90.

Cylindrical lenses 88 and 90 are arranged so that their axes intersect at right angles. These lenses apply astigmatism to the laser beam, in different directions. Accordingly, when objective lens 60 is in a focusing state, as shown in FIGS. 5A and 6A, a circular beam spot is formed on each of detectors 72 and 74. When lens 60 is in a defocusing state, as shown in FIGS. 5B and 6B or FIGS. 5C and 6C, elliptic beam spots, elongated at right angles to each other, are formed individually on detectors 72 and 74.

First photodetector 72 has four photosensitive regions 72-1, 72-2, 72-3 and 72-4, and second photodetector 74 has another four photosensitive regions 74-1, 74-2, 74-3 and 74-4. Regions 72-1, 72-2, 72-3 and 72-4 of detector 72 are connected to first adder 76, while regions 74-1, 74-2, 74-3 and 74-4 of detector 74 are connected to second adder 78. Adders 76 and 78 are both connected to subtracter 80. Since the P- and S-polarized light components are incident on first and second photodetectors 72 and 74, respectively, first and second adders 76 and 78 produce electrical signals corresponding to the P- and S-components, respectively. A subtraction signal, representing the difference between the signals from the adders, is delivered from subtracter 80. It is equivalent to the difference in luminous intensity between the P- and S-polarized light components. In other words, subtracter 80 produces an information signal which represents the intensity difference between the P- and S-polarized components.

First and second photosensitive regions 72-1 and 72-2; 74-1 and 74-2 of first and second photodetectors 72 and 74 are connected to third adder 82. Third and fourth photosensitive regions 72-3 and 72-4; 74-3 and 73-4 are connected to fourth adder 84. Adders 82 and 84 are connected to subtracter 86. When objective lens 60 is in the focusing state, a substantially circular beam spot is formed on the center region of each of photodetectors 72 and 74, as shown in FIGS. 5A and 6A. Therefore, output signals from the four photosensitive regions of each detector are equal in level, so that summ signals from adders 82 and 84 are also equal in level. Thus, a focusing error signal, at a substantially zero level, is delivered from subtracter 86, and objective lens 60 is kept in the focusing state. If lens 60 is in the defocusing state, where it is located between optical disk 62 and the position for the focusing state, substantially elliptic beam spots are formed individually on photodetectors 72 and 74, as shown in FIGS. 5B and 6B. In first photodetector 72, therefore, the level of signals from third and fourth regions 72-3 and 72-4 is higher than that of signals from first and second regions 72-1 and 72-2. In second photodetector 74, on the other hand, the level of signals from third and fourth regions 74-3 and 74-4 is lower than that of signals from first and second regions 74-1 and 74-2. Thus, the level of the summ signal from third adder 82 is lower than that of the summ signal from fourth adder 84. Accordingly, subtracter 86 produces a negative-level focusing error signal. In response to this signal, objective lens 60 is moved toward the position for the focusing state, along its optical axis, by voice coil 61. If lens 60 is in the defocusing state, where it is located between mirror 58 and the position for the focusing state, moreover, substantially elliptic beam spots are formed individually on photodetectors 72 and 74, as shown in FIGS. 5C and 6C. The arrangement of the beam spots shown in FIGS. 5C and 6C are different from that shown in FIGS. 5B and 6B. In first photodetector 72, therefore, the level of the signals from third and fourth regions 72-3 and 72-4 is lower than that of the signals from first and second regions 72-1 and 72-2. In second photodetector 74, on the other hand, the level of the signals from third and fourth regions 74-3 and 74-4 is higher than that of the signals from first and second regions 74-1 and 74-2. Thus, the level of the sum signal from third adder 82 is higher than that of the sum signal from fourth adder 84. Accordingly, subtracter 86 produces a positive-level focusing error signal. In response to this signal, objective lens 60 is moved toward the position for the focusing state, along its optical axis, by voice coil 61. A tracking signal can be obtained in the same manner as the focusing signal. In doing this, detection signals from regions 72-3 and 74-1 of photodetectors 72 and 74 are added by means of an adder (not shown), those from regions 72-4 and 74-2 are also added by means of another adder (not shown), and the difference between the two sums is calculated. In response to the tracking signal, objective lens 60 is moved in a direction perpendicular to its optical axis, by an actuator (not shown).

Thus, in the optical system shown in FIG. 3, the focusing error signal, information signal, and tracking signal can be all obtained with use of only a pair of photodetectors. Accordingly, the optical system can be made compact and light in weight. Moreover, the cylindrical lenses, corresponding individually to the first and second photodetectors, are arranged so that their longitudinal axes intersect each other at right angles. If diffraction patterns of the tracking guide or the like appear in the photosensitive regions of the detectors, therefore, corresponding portions of the patterns are produced in those regions which are in subtractive relation. Thus, the focusing error signal is prevented from being interfered with noises, attributable to diffraction patterns.

Referring now to FIGS. 7, 8, 9A, 9B, 10A, 10B, 11A and 11B, another embodiment of the present invention will be described. An optical system of an optical head shown in FIG. 7, which does not use the astigmatism process, differs from the one shown in FIG. 3 only in that it is not provided with the cylindrical lenses. In the description to follow, like reference numerals are used to designate like portions for simplicity.

Figure 7:
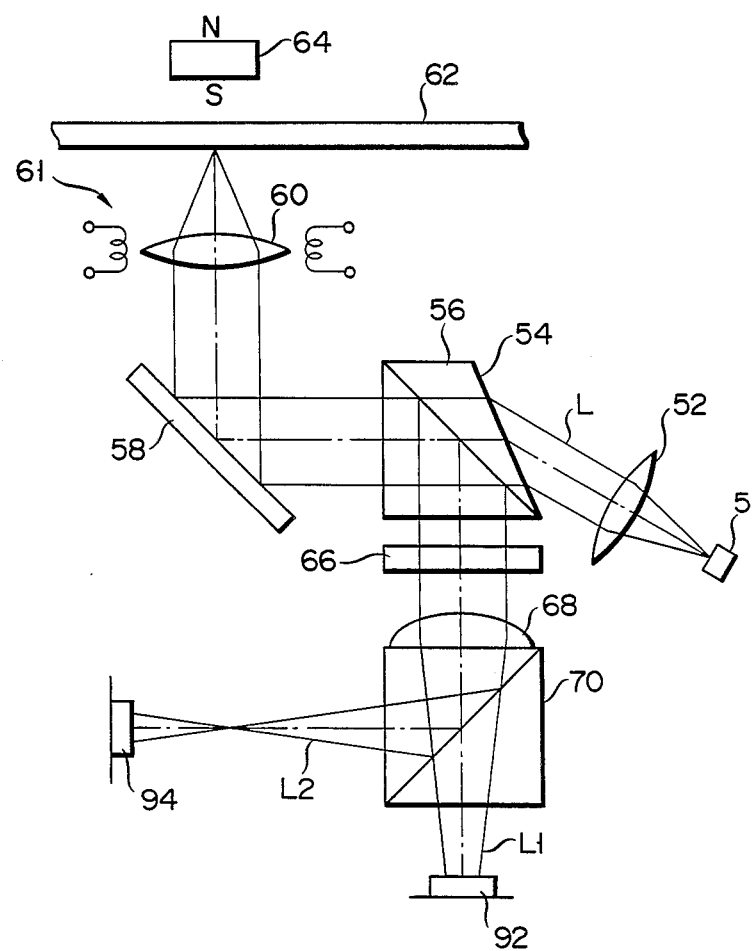
FIG. 7 is a schematic view of an optical head according to another embodiment of the invention.

In the optical head shown in FIG. 7, light beam L1, as a P-polarized light component, transmitted through polarized beam splitter 70, is applied to first photodetector 92, which is located nearer to splitter 70 than the focal point of beam L1. On the other hand, light beam L2, reflected by splitter 70, is applied to second photodetector 94, which is located farther from splitter 70 than the focal point of beam L2.

First and second photodetectors 92 and 94 have similar configurations, and are divided into three segment regions each. Also, they are located so that the quantities of light beams L1 and L2, applied to photodetectors 92 and 94, respectively, are equal when objective lens 60 is focused on optical disk 62.

As shown in FIG. 8, the respective photosensitive regions of first and second photodetectors 92 and 94 are each divided into inner and outer concentric regions. The outer concentric region is divided further into two parts, having the same area. Thus, the three segment regions are obtained. In other words, each photodetector includes first, second, and third photosensitive region 92A or 94A, 92B or 94B, and 92C or 94C. Moreover, photodetectors 92 and 94 are arranged so that boundary lines, between second and third regions 92B and 92C and between regions 94B and 94C, are parallel to the extending direction of an image of the track of disk 62, formed on the detectors.

Referring now to FIGS. 8 to 11B, detecting means for the focusing error signal, in the optical head, will be described.

Figure 9A:
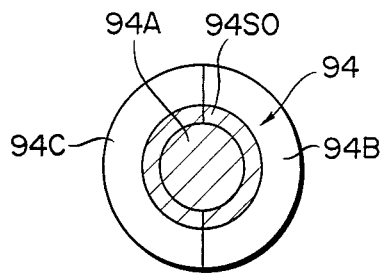
FIGS. 9A, 9B, 10A, 10B, 11A and 11B are plan views showing configurations of beam spots formed on the photodetectors for focus detection of FIG. 4, in focusing and defocusing states.
Figure 9B:
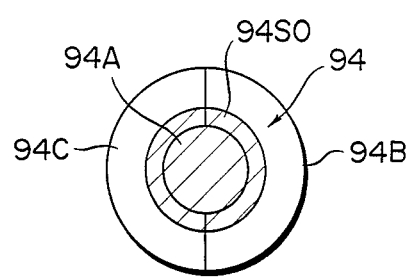

FIGS. 9A and 9B show spot configurations $92S_0$ and $94S_0$, respectively, of light beams L1 and L2, as P- and S-polarized light components, applied to first and second photodetectors 92 and 94, respectively, when objective lens 60 is in the focusing state. The photodetectors are located so that the intensities of light beams L1 and L2, applied to photodetectors 92 and 94, respectively, are equal, in the focusing state. Therefore, spot configurations $92S_0$ and $94S_0$ of beams L1 and L2 are identical with each other, as shown in FIGS. 9A and 9B.

Figure 10A:
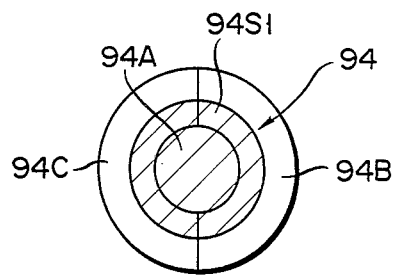
Figure 10B:
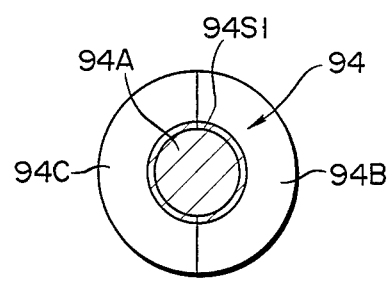

FIGS. 10A and 10B show spot configurations $92S_1$ and $94S_1$, respectively, of light beams L1 and L2, applied to first and second photodetectors 92 and 94, respectively, when objective lens 60 is located too close to disk 62 to be in the focusing state.

In the state shown in FIGS. 10A and 10B, the spot of light beam L1, applied to first photodetector 92, is larger than that obtained in the focusing state, while the spot of light beam L2, applied to second photodetector 94, is smaller.

Figure 11A:
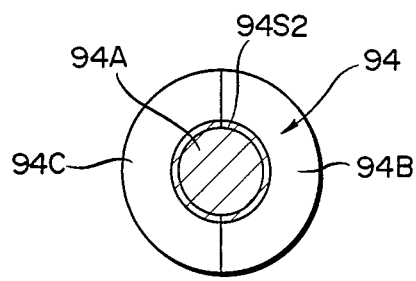
Figure 11B:
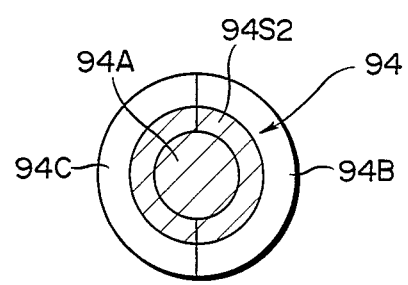

FIGS. 11A and 11B show spot configurations $92S_2$ and $94S_2$, respectively, of light beams L1 and L2, applied to first and second photodetectors 92 and 94, respectively, when objective lens 60 is located too far from disk 62 to be in the focusing state.

In the state shown in FIGS. 11A and 11B, in contrast with the state of FIGS. 10A and 10B, the spot of light beam L1, applied to first photodetector 92, is smaller than that obtained in the focusing state, while the spot of light beam L2, applied to second photodetector 94, is larger.

If focusing errors occur in the optical head, as described above, the spot sizes of light beams L1 and L2, on first and second photodetectors 92 and 94, that is, the intensities of light detected by the photodetectors, vary from those obtained in the focusing state, in opposite manners.

Thus, first and second photodetectors 92 and 94, as detection systems using the same principle of focusing error detection, are disposed on the respective optical paths of two light beams L1 and L2, polarized by polarized-beam splitter 70. With this arrangement, the influence of the opposite configurations of the beam spots, attributable to focusing errors, on the focusing error signal, can be minimized.

The focusing error of this optical head can be detected by detecting the difference between the sum of the quantities of light, applied to first photosensitive region 92A of first photodetector 92, and second and third photosensitive regions 94B and 94C of second photodetector 94, and the sum of the quantities of light, applied to second and third photosensitive regions 92B and 92C of first photodetector 92, and first photosensitive region 94A of second photodetector 94.

FIG. 8 schematically shows a circuit, which processes signals from first and second photodetectors 92 and 94 for detecting the aforesaid focusing error. Signal Sa from first photosensitive region 92A of photodetector 92, and signals Sb1 and Sc1 from second and third photosensitive regions 94B and 94C of photodetector 94, are added in adder circuit 106. Likewise, signals Sb0 and Sc0 from second and third photosensitive regions 92B and 92C of photodetector 92, and signal Sa1 from first photosensitive region 94A of second photodetector 94, are added in adder circuit 108. Output signals from circuits 106 and 108 are fed to subtracter circuit 110, where they are subjected to subtraction. Focusing error signal Sf is delivered from the output terminal of circuit 110. Sf is given by $$Sf = (Sa0 + Sb1 + Sc1) - (Sa1 + Sb + Sc). \quad (1)$$

If signal Sf is zero, objective lens 60 is kept focused on disk 62. If Sf is positive, then it indicates that lens 60 is in the defocusing state, where it is located too close to optical disk 62 to be focused. If Sf is negative, then it indicates that lens 60 is located too far from optical disk 62 to be focused. Thus, optical disk 62 is actuated in response to focusing error signal Sf so that the focal point of objective lens 60 is compensated.

According to this method of focusing error detection, if diffraction patterns are formed on the photodetectors, due to the information pits on disk 62, the effects of such diffraction patterns appear on first and second photodetectors 72 and 74, in symmetrical relation with respect to the center of each detector. If the focusing error signal is detected as indicated by eq. (1), therefore, the influences of the diffraction patterns can be offset. Thus, an accurate focusing error signal can be detected without being influenced by the tracking guide or pits.

If light beams L1 and L2 lose their circularness, due to scratches or dust on disk 62 or any other causes, they appear on first and second photodetectors 92 and 94, as symmetrical spots, with respect to the respective centers of the detectors. Therefore, the influences of these circumstances can be canceled by detecting the focusing error signal in accordance with eq. (1). Thus, the focusing error signal can be detected with accuracy.

If the beam spots are moved, due to inclination of optical disk 62 or dislocation of the optical axis by change of environment, such as temperature change, impact, etc., the changing rates of the quantities of light, applied to the individual photosensitive regions of first and second photodetectors 92 and 94, are substantially equal. Thus, the influences of the inclination or dislocation on the focusing error signal can be eliminated.

In the optical head of this embodiment, moreover, the information in optical disk 62 can be read out also by means of light beams L1 and L2, which retrieve focusing error signal Sf.

In reading the information from disk 62, signals Sa0, Sb0 and Sc0 from first, second, and third photosensitive regions 92A, 92B and 92C of first photodetector 92 are added in adder circuit 112, as shown in the circuit diagram of FIG. 8. Likewise, signals Sa1, Sb1 and Sc1 from first, second, and third photosensitive regions 94A, 94B and 94C of second photodetector 94 are added in adder circuit 114. Output signals from adder circuits 112 and 114 are delivered to subtracter circuit 86, to be subjected to subtraction therein. The output of circuit 86 is processed as an information retrieval signal, corresponding to the difference between P-component polarized beam L1 and S-component polarized beam L2, by the so-called differential detection method.

According to the optical head of this embodiment, furthermore, tracking signal Fd can also be obtained by producing signal Fa, by means of the light beams for the focusing error detection. Signal Fa is given by $$Fa = (Sb0 + Sb1) - (Sc0 + Sc1)$$

Despite the relatively simple construction, therefore, the optical head of this embodiment can duly perform focusing error detection, information signal detection, and tracking error detection.

Thus, even though the focusing error is detected by the astigmatism method, the influences of the aforementioned circumstances can be removed, since the astigmatisms of the two systems are opposite to each other. Also, with use of the optical head constructed in this manner, the information signal can be retrieved by detecting the difference between output signals from third and fourth photodetectors, by means of light beams L1 and L2 used in the focusing error detection.

According to the present invention, as described herein, there may be provided an optical head which, having a relatively simple construction, can perform accurate focusing error detection with high reliability.

What is claimed is:

1. A system which records information on an information recording medium, and retrieves and erases the recorded information from the medium, comprising:
    means for emitting a light beam;
    an objective lens for focusing the light beam emitted from said emitting means, on the information recording medium;
    means for applying a magnetic field to the information recording medium, in erasing or recording the information;
    means for splitting the light beam, reflected from the information recording medium and transmitted through the objective lens, into first and second light beams which are polarized on different polarization planes, respectively;
    a first photodetector having a plurality of photosensitive regions on which the first light beam is incident, whereby the first light beam is detected, said photosensitive regions delivering detection signals;
    a second photodetector having a plurality of photosensitive regions on which the second light beam is incident, whereby the second light beam is detected, said photosensitive regions delivering detection signals;
    means for processing the detection signals from the photosensitive regions of the first and second photodetectors, and delivering a focusing error signal and an information signal; and
    means for moving the objective lens along the optical axis thereof, in response to the focusing signal, thereby keeping the objective lens in a focusing state such that the light beam is focused on the information recording medium by the lens.

2. The system according to claim 1, wherein said first and second photodetectors have substantially the same structure.

3. The system according to claim 1, further comprising a half wave plate interposed between the beam splitting means and the objective lens.

4. The system according to claim 1, further comprising means for converging the light beam on the first and second photodetectors, said converging means having a focal point.

5. The system according to claim 3, wherein one of said first and second photodetectors has its photosensitive regions provided between the converging means and the focal point thereof, and the other photodetector has its photosensitive regions located outside the focal point of the converging means.

6. The system according to claim 5, wherein each of said first and second photodetectors includes a circular first photosensitive region, and second and third photosensitive regions of equal areas, surrounding the first region concentrically.

7. The system according to claim 6, wherein, in the focusing state, a first detection signal, delivered from the first photosensitive region of each of the first and second photodetectors, has a level substantially equal to that of the sum of second and third detection signals, delivered from the second and third photosensitive regions, respectively.

8. The system according to claim 6, further comprising:
first adder means for adding a first detection signal, delivered from the first photosensitive region of the first photodetector, and second and third detection signals, delivered from the second and third photosensitive regions of the second photodetector, respectively, thereby producing a first sum output;
second adder means for adding a first detection signal, delivered from the first photosensitive region of the second photodetector, and second and third detection signals, delivered from the second and third photosensitive regions of the first photodetector, respectively, thereby producing a second sum output; and
first subtracter means for executing subtraction between the first and second sum outputs, thereby producing a first subtraction output, as the focusing error signal.

9. The system according to claim 6, further comprising:
third adder means for adding first, second, and third detection signals, delivered from the first, second, and third photosensitive regions of the first photodetector, respectively, thereby producing a third sum output;
fourth adder means for adding first, second, and third detection signals, delivered from the first, second, and third photosensitive regions of the second photodetector, respectively, thereby producing a fourth sum output; and
second subtracter means for executing subtraction between the third and fourth sum outputs, thereby producing a second subtraction output, as the information signal.

10. The system according to claim 3, further comprising first and second cylindrical lenses each having a longitudinal axis, and disposed between the beam splitting means and the first and second photodetectors, respectively.

11. The system according to claim 10, wherein said first and second cylindrical lenses are arranged so that their longitudinal axes intersect each other at right angles.

12. The system according to claim 11, wherein each of said first and second photodetectors includes first, second, third, and fourth photosensitive regions of equal areas, divided by first and second boundary lines intersecting each other, said first boundary line dividing the first and third photosensitive regions from the second and fourth photosensitive regions, respectively, and said second boundary line dividing the first and second photosensitive regions from the third and fourth photosensitive regions, respectively.

13. The system according to claim 12, wherein, in the focusing state, a first sum signal, obtained by adding first and second detection signals, delivered from the first and second photosensitive regions of the first photodetector, respectively, and third and fourth detection signals, delivered from the third and fourth photosensitive regions of the second photodetector, respectively, has a level equal to that of a second sum signal, obtained by adding third and fourth detection signals, delivered from the third and fourth photosensitive regions of the first photodetector, respectively, and first and second detection signals, delivered from the first and second photosensitive regions of the second photodetector, respectively.

14. The system according to claim 12, further comprising:
first adder means for adding first and second detection signals, delivered from the first and second photosensitive regions of the first photodetector, respectively, and third and fourth detection signals, delivered from the third and fourth photosensitive regions of the second photodetector, respectively, thereby producing a first sum output;
second adder means for adding third and fourth detection signals, delivered from the third and fourth photosensitive regions of the first photodetector, respectively, and first and second detection signals, delivered from the first and second photosensitive regions of the second photodetector, respectively, thereby producing a second sum output; and
first subtracter means for executing subtraction between the first and second sum outputs, thereby producing a first subtraction output, as the focusing error signal.

15. The system according to claim 12, further comprising:
third adder means for adding first, second, third, and fourth detection signals, delivered from the first, second, third, and fourth photosensitive regions of the first photodetector, respectively, thereby producing a third sum output;
fourth adder means for adding first, second, third, and fourth detection signals, delivered from the first, second, third, and fourth photosensitive regions of the second photodetector, respectively, thereby producing a fourth sum output; and
second subtracter means for executing subtraction between the third and fourth sum outputs, thereby producing a second subtraction output, as the information signal.

* * * * *